United States Patent
Kajouke et al.

(10) Patent No.: US 8,462,528 B2
(45) Date of Patent: Jun. 11, 2013

(54) SYSTEMS AND METHODS FOR REDUCING TRANSIENT VOLTAGE SPIKES IN MATRIX CONVERTERS

(75) Inventors: Lateef A. Kajouke, San Pedro, CA (US); Milun Perisic, Torrance, CA (US); Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 12/839,134

(22) Filed: Jul. 19, 2010

(65) Prior Publication Data

US 2012/0014140 A1   Jan. 19, 2012

(51) Int. Cl.
*H02M 7/797* (2006.01)

(52) U.S. Cl.
USPC ............... 363/127; 363/132; 363/163

(58) Field of Classification Search
USPC ............ 363/2, 10, 95, 97, 98, 131, 132, 157, 363/163, 164, 3, 8, 84, 89, 125, 127
See application file for complete search history.

(56) References Cited

U.S. PATENT DOCUMENTS

| | | | |
|---|---|---|---|
| 4,669,036 A | 5/1987 | Cowett, Jr. | |
| 5,159,539 A | 10/1992 | Koyama | |
| 5,189,603 A * | 2/1993 | Sashida et al. | 363/160 |
| 5,274,538 A | 12/1993 | Sashida et al. | |
| 5,285,365 A | 2/1994 | Yamato et al. | |
| 5,461,297 A | 10/1995 | Crawford | |
| 5,545,971 A | 8/1996 | Gomez et al. | |
| 5,949,659 A | 9/1999 | Lesche | |
| 6,034,513 A | 3/2000 | Farrington et al. | |
| 6,147,886 A | 11/2000 | Wittenbreder | |
| 6,351,397 B1 | 2/2002 | Sawa et al. | |
| 6,496,343 B2 | 12/2002 | Mahlein et al. | |
| 6,538,909 B2 | 3/2003 | Goodarzi et al. | |
| 6,566,764 B2 | 5/2003 | Rebsdorf et al. | |
| 6,583,519 B2 | 6/2003 | Aberle et al. | |
| 6,614,132 B2 | 9/2003 | Hockney et al. | |
| 6,989,613 B2 | 1/2006 | Andrews et al. | |
| 6,998,732 B2 | 2/2006 | Xing et al. | |

(Continued)

FOREIGN PATENT DOCUMENTS

| | | |
|---|---|---|
| DE | 102007040550 A1 | 3/2008 |
| GB | 2459542 A | 11/2009 |
| JP | 2008306855 A | 12/2008 |

OTHER PUBLICATIONS

Office Action, dated Oct. 5, 2011, for U.S. Appl. No. 12/413,181.

(Continued)

*Primary Examiner* — Gary L Laxton
(74) *Attorney, Agent, or Firm* — Ingrassia Fisher & Lorenz, P.C.

(57) ABSTRACT

Systems and methods are provided for delivering energy using an energy conversion module that includes one or more switching elements. An exemplary electrical system comprises a DC interface, an AC interface, an isolation module, a first conversion module between the DC interface and the isolation module, and a second conversion module between the AC interface and the isolation module. A control module is configured to operate the first conversion module to provide an injection current to the second conversion module to reduce a magnitude of a current through a switching element of the second conversion module before opening the switching element.

20 Claims, 6 Drawing Sheets

U.S. PATENT DOCUMENTS

| | | | |
|---|---|---|---|
| 7,330,363 | B2 | 2/2008 | Ponnaluri et al. |
| 7,483,282 | B2 * | 1/2009 | Kajouke et al. ............... 363/149 |
| 7,492,221 | B2 | 2/2009 | Lawson et al. |
| 7,525,296 | B2 | 4/2009 | Billig et al. |
| 7,599,204 | B2 | 10/2009 | Kajouke et al. |
| 7,679,941 | B2 | 3/2010 | Raju et al. |
| 7,764,527 | B2 | 7/2010 | Takayanagi |
| 8,063,606 | B2 | 11/2011 | Veselic |
| 8,199,545 | B2 * | 6/2012 | Nguyen et al. ................. 363/165 |
| 8,288,887 | B2 | 10/2012 | Ransom et al. |
| 2001/0012207 | A1 | 8/2001 | Nomura |
| 2001/0026427 | A1 | 10/2001 | Mahlein et al. |
| 2001/0036086 | A1 | 11/2001 | Pascu et al. |
| 2002/0044468 | A1 | 4/2002 | Goodarzi et al. |
| 2002/0176261 | A1 * | 11/2002 | Norrga ............................ 363/17 |
| 2003/0102718 | A1 | 6/2003 | Hockney et al. |
| 2004/0026929 | A1 | 2/2004 | Rebsdorf et al. |
| 2004/0041543 | A1 | 3/2004 | Brooks et al. |
| 2004/0066663 | A1 | 4/2004 | Raichle |
| 2004/0119449 | A1 | 6/2004 | Matley |
| 2004/0257271 | A1 | 12/2004 | Jacobson et al. |
| 2007/0035265 | A1 | 2/2007 | Balog, Jr. et al. |
| 2007/0139975 | A1 | 6/2007 | Yamauchi et al. |
| 2007/0274109 | A1 | 11/2007 | Oyobe et al. |
| 2008/0013351 | A1 | 1/2008 | Alexander |
| 2008/0055938 | A1 | 3/2008 | Kajouke et al. |
| 2008/0055954 | A1 | 3/2008 | Kajouke et al. |
| 2008/0130339 | A1 | 6/2008 | McDonald et al. |
| 2009/0033393 | A1 | 2/2009 | Park et al. |
| 2009/0251938 | A1 | 10/2009 | Hallak |
| 2009/0322287 | A1 | 12/2009 | Ozeki et al. |
| 2010/0103703 | A1 | 4/2010 | Nishiyama et al. |
| 2011/0031927 | A1 | 2/2011 | Kajouke et al. |
| 2011/0031930 | A1 | 2/2011 | Kajouke |
| 2011/0032732 | A1 | 2/2011 | Hsu |
| 2011/0080151 | A1 | 4/2011 | Rahardjo et al. |
| 2011/0089928 | A1 | 4/2011 | O'Gorman et al. |
| 2011/0227407 | A1 | 9/2011 | Ransom |
| 2012/0014140 | A1 | 1/2012 | Kajouke et al. |
| 2012/0112549 | A1 | 5/2012 | Perisic et al. |
| 2012/0113683 | A1 | 5/2012 | Perisic et al. |
| 2012/0113700 | A1 | 5/2012 | Kajouke et al. |

OTHER PUBLICATIONS

German Office Action, dated Mar. 21, 2012, for German Patent Application No. 10 2011 085 063.5.

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

Kajouke, L.A., "Unity Power Factor Isolated Single Phase Matrix Converter Battery Charger," U.S. Appl. No. 12/413,181, filed Mar. 27, 2009.

Kajouke, L.A., "Systems and Methods for Bi-Directional Energy Delivery With Galvanic Isolation," U.S. Appl. No. 12/535,975, filed Aug. 5, 2009.

Kajouke, L.A., et al. "Charging System With Galvanic Isolation and Multiple Operating Modes," U.S. Appl. No. 12/535,994, filed Aug. 5, 2009.

Ransom, R. M. et al. Systems and Methods for Commutating Inductor Current Using a Matrix Converter,: U.S. Appl. No. 12/622,088, filed Nov. 19, 2009.

Ransom, R. M. "Systems and Methods for Deactivating a Matrix Converter," U.S. Appl. No. 12/725,265, filed Mar. 16, 2010.

USPTO, U.S. "Final Office Action" mailed Jun. 28, 2012, for U.S. Appl. No. 12/535,994, filed Aug. 5, 2008.

USPTO, U.S. "Final Office Action" mailed May 10, 2012, for U.S. Appl. No. 12/413,181, filed Mar. 27, 2009.

USPTO, U.S. "Notice of Allowance" mailed Jun. 11, 2012, for U.S. Appl. No. 12/622,088, filed Nov. 19, 2009.

U.S. Office Action, dated Nov. 25, 2011, for U.S. Appl. No. 12/622,088.

U.S. Office Action, dated Jan. 23, 2012, for U.S. Appl. No. 12/535,994.

Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

German Office Action, dated Jan. 27, 2012, for German Patent Application No. 10 2010 031 615.6.

U.S. Office Action, dated Feb. 8, 2012, for U.S. Appl. No. 12/535,975.

Perisic, M., et al. "Systems and Methods for Providing Power to a Load Based Upon a Control Strategy," U.S. Appl. No. 13/222,961, filed Aug. 31, 2011.

Perisic, M., et al. "Compensation for Electrical Converter Nonlinearities," U.S. Appl. No. 12/941,552, filed Nov. 8, 2010.

Perisic, M., et al. "Systems and Methods for Providing Power to a Load Based Upon a Control Strategy," U.S. Appl. No. 12/949,439, filed Nov. 18, 2010.

Ransom, Ray., et al. "Systems and Methods for Initializing a Charging System," U.S. Appl. No. 13/149,484, filed May 31, 2011.

Perisic, M., et al. "Compensation for Electrical Converter Nonlinearities," U.S. Appl. No. 12/941,521, filed Nov. 8, 2010.

Kajouke, L.A., et al. "Systems and Methods for Reducing Harmonic Distortion in Electrical Converters," U.S. Appl. No. 12/941,488, filed Nov. 8, 2010.

Delorme, Gilles M., et al. "Methods and Systems for Controlling Vehicle Defrost Units," U.S. Appl. No. 12/871,664, filed Aug. 30, 2010.

Kajouke, L.A., et al. "Discharging a DC Bus Capacitor of an Electrical Converter System," U.S. Appl. No. 13/090,911, filed Apr. 20, 2011.

Office Action, dated Jul. 23, 2012, for U.S. Appl. No. 12/725,265.

Final Office Action, dated Aug. 2, 2012, for U.S. Appl. No. 12/535,975.

USPTO, Notice of Allowance and Fee(s) Due for U.S. Appl. No. 12/535,994, mailed Sep. 7, 2012.

USPTO, Office Action in U.S. Appl. No. 12/941,488, mailed Mar. 20, 2013.

Office Action, dated Oct. 24, 2012, for U.S. Appl. No. 12/941,552.

Office Action, dated Nov. 9, 2012, for U.S. Appl. No. 12/949,439.

Notice of Allowance, dated Nov. 15, 2012, for U.S. Appl. No. 12/725,265.

Notice of Allowance, dated Nov. 16, 2012, for U.S. Appl. No. 12/535,975.

* cited by examiner

SYSTEMS AND METHODS FOR REDUCING TRANSIENT VOLTAGE SPIKES IN MATRIX CONVERTERS

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to energy delivery systems that utilize one or more inductive elements.

BACKGROUND

Matrix converters may be used in electric and/or hybrid vehicles to accommodate delivery of relatively high power over a relatively wide range of operating voltages, while at the same time achieving galvanic isolation, relatively high power factors, low harmonic distortion, relatively high power density and low cost. For example, bidirectional isolated matrix converters may be used to deliver energy from an alternating current (AC) energy source, such as the single-phase grid electricity common in most residential and commercial buildings, to charge a direct current (DC) energy storage element, such as a rechargeable battery, in a vehicle.

Often, an inductor is present between the AC energy source and the matrix converter. Interrupting the inductor current may result in undesirable and potentially damaging voltage spikes across components of the matrix converter. During a switching cycle, the matrix converter alternates between circulating (or free-wheeling) the inductor current and delivering energy (or current) to the DC energy storage element with a duty cycle that achieves a desired power flow from the AC energy source to the DC energy storage element. However, due to parasitic and leakage inductances within the matrix converter hardware, transitioning from circulating the inductor current to delivering energy may also produce undesirable and potentially damaging voltage spikes across components of the matrix converter.

One common approach to this problem involves the use of snubber circuits configured electrically in parallel across switches of the matrix converter. However, this approach adds lossy components to the system that reduce efficiency and increase costs. Another approach involves the use of soft switching techniques by adding resonant inductors or quasi-resonant snubbers. This approach also add components, reduces efficiency, and increases costs and circuit complexity.

BRIEF SUMMARY

In accordance with one embodiment, an electrical system is provided. The electrical system includes a first interface, a second interface, an isolation module, a first conversion module, a second conversion module, and a control module. The first conversion module is coupled between the first interface and the isolation module and the second conversion module coupled between the second interface and the isolation module. The control module is coupled to the first conversion module and the second conversion module, and the control module is configured to operate the first conversion module to provide an injection current to the second conversion module to reduce a magnitude of a current through a switching element of the second conversion module before opening the first switching element.

In accordance with another embodiment, a method is provided for delivering energy using an energy conversion module including a switching element coupled to an inductive element. The method comprises closing the switching element to conduct a switch current through the switching element between a first node to a second node. The switch current includes at least some of a current through the inductive element. The method continues by providing an injection current at the first node, wherein the injection current decreases a magnitude of the switch current. And opening the switching element when the magnitude of the switch current is less than a threshold value.

In another embodiment, an electrical system is provided. The electrical system comprises a direct current (DC) interface, an alternating current (AC) interface, an isolation module including a first set of windings magnetically coupled to a second set of windings, a first conversion module coupled between the DC interface and the first set of windings, a second conversion module coupled to the second set of windings, an inductive element coupled between the second conversion module and the AC interface, and a control module coupled to the first conversion module and the second conversion module. The control module is configured to operate the second conversion module to cycle current through the inductive element and operate the first conversion module to provide an injection current through the second set of windings before operating the second conversion module to deliver energy from the inductive element to the DC interface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
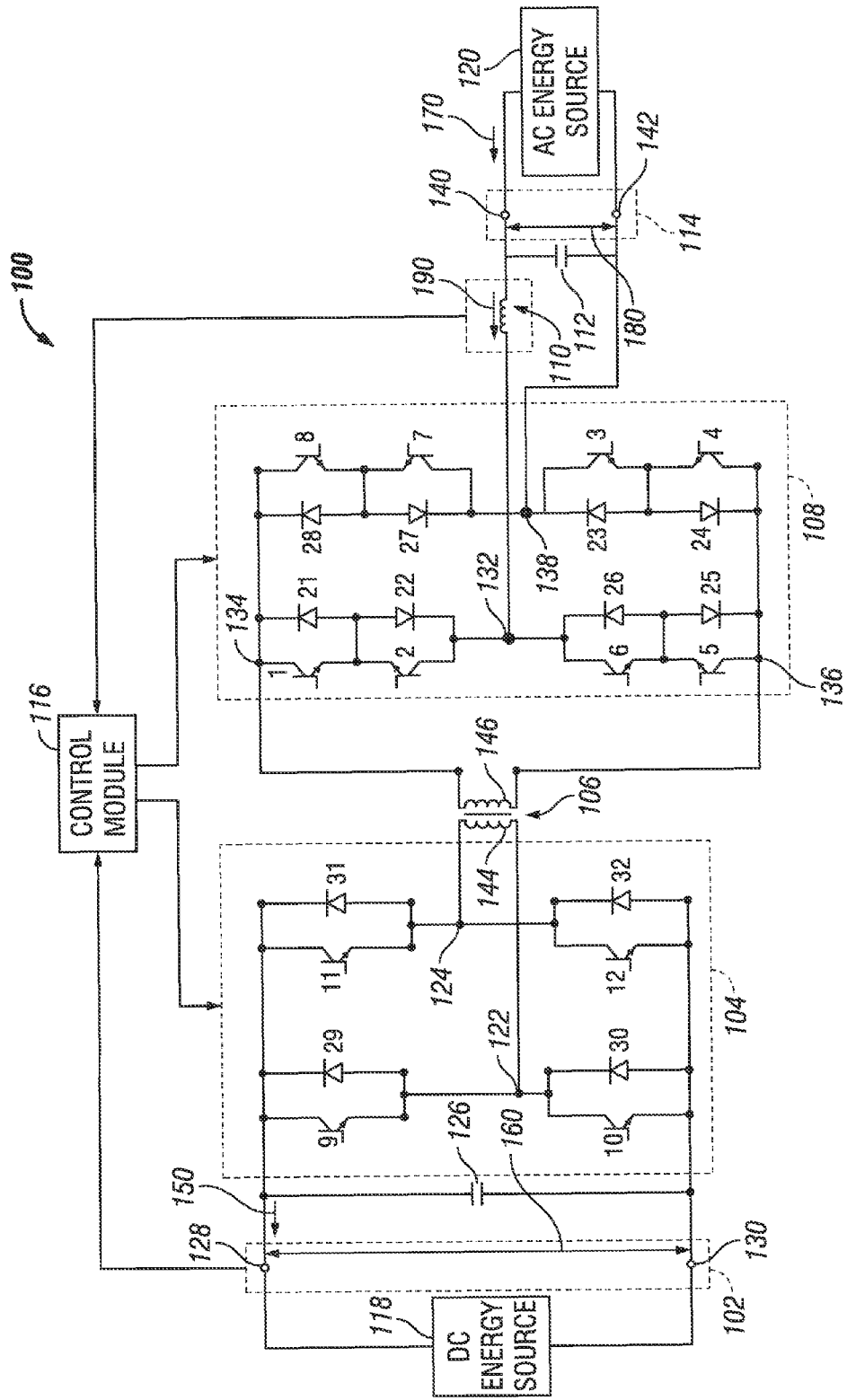
FIG. 1 is a schematic view of a electrical system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Technologies and concepts discussed herein relate generally to matrix converter systems capable of decreasing the current through one or more switches of the matrix converter before opening the respective one or more switches, which in turn, prevents or otherwise inhibits voltage spikes across the one or more switches that would otherwise be attributable to parasitic capacitances and/or leakage inductances in the matrix converter system. As described in greater detail below, an energy conversion module that is inductively coupled to the matrix converter (e.g., via a transformer) is operated to cause a current to flow from a direct current (DC) energy source that induces an injection current in the windings coupled to the matrix converter. The injection current reduces the magnitude of the current flowing through the one or more switches of the matrix converter to be opened, and when the current flowing through the respective switches of the matrix converter is below a threshold value, the respective switches of the matrix converter are opened to deliver energy to the DC energy source. In an exemplary embodiment, the injection current is configured such that the current flowing through the one or more switches that are opened is substantially equal to zero at the instant the respective switches are opened. In this manner, voltage transients across the switches are prevented, inhibited, or otherwise reduced, thereby allowing the matrix converter to be implemented with components having lower power/voltage handling requirements and with smaller (or entirely without) snubbers or other lossy components.

FIG. 1 depicts an exemplary embodiment of an electrical system 100 (or alternatively, a charging system, charger or charging module) suitable for use in a vehicle, such as, for example, an electric and/or hybrid vehicle. The electrical system 100 includes, without limitation, a first interface 102, a first energy conversion module 104, an isolation module 106, a second energy conversion module 108, an inductive element 110, a capacitive element 112, a second interface 114, and a control module 116. The first interface 102 generally represents the physical interface (e.g., terminals, connectors, and the like) for coupling the electrical system 100 to a DC energy source 118 and the second interface 114 generally represents the physical interface (e.g., terminals, connectors, and the like) for coupling the electrical system 100 to an alternating current (AC) energy source 120. Accordingly, for convenience, the first interface 102 may be referred to herein as the DC interface and the second interface 114 may be referred to herein as the AC interface. In an exemplary embodiment, the control module 116 is coupled to the conversion modules 104, 108 and operates the conversion modules 104, 108 to achieve a desired power flow from the AC energy source 120 to the DC energy source 118, as described in greater detail below.

In an exemplary embodiment, the DC energy source 118 (or alternatively, the energy storage source or ESS) is capable of receiving a direct current ($i_{DC}$) (indicated by arrow 150) from the electrical system 100 at a particular DC voltage level ($V_{DC}$) (indicated by arrow 160). In accordance with one embodiment, the DC energy source 118 is realized as a rechargeable high-voltage battery pack having a nominal DC voltage range from about 200 to about 500 Volts DC. In this regard, the DC energy source 118 may comprise the primary energy source for another electrical system and/or an electric motor in a vehicle. For example, the DC energy source 118 may be coupled to a power inverter that is configured to provide voltage and/or current to the electric motor, which, in turn, may engage a transmission to drive the vehicle in a conventional manner. In other embodiments, the DC energy source 118 may be realized as a battery, a fuel cell, an ultracapacitor, or another suitable energy storage element.

The AC energy source 120 (or power source) is configured to provide an AC current ($i_{AC}$) (indicated by arrow 170) to the charging system 100 at a particular AC voltage level ($V_{AC}$) (indicated by arrow 180) and may be realized as a main power supply or main electrical system for a building, residence, or another structure within an electric power grid (e.g., mains electricity or grid power). In accordance with one embodiment, the AC energy source 120 comprises a single-phase power supply, as is common to most residential structures, which varies depending on the geographic region. For example, in the United States, the AC energy source 120 may be realized as 120 Volts (RMS) or 240 Volts (RMS) at 60 Hz, while in other regions the AC energy source 120 may be realized as 110 Volts (RMS) or 220 Volts (RMS) at 50 Hz. In alternative embodiments, the AC energy source 120 may be realized as any AC energy source suitable for operation with the charging system 100.

As described in greater detail below, the DC interface 102 is coupled to the first conversion module 104 and the AC interface 114 is coupled to the second conversion module 108 via the inductive element 110. The isolation module 106 is coupled between the conversion modules 104, 108 and provides galvanic isolation between the two conversion modules 104, 108. The control module 116 is coupled to the conversion modules 104, 108 and operates the second conversion module 108 to convert energy from the AC energy source 120 to high-frequency energy across the isolation module 106 which is then converted to DC energy at the DC interface 102 by the conversion module 104. It should be understood that although the subject matter may be described herein in the context of a grid-to-vehicle application (e.g., the AC energy source 120 delivering energy to the DC energy source 118) for purposes of explanation, in other embodiments, the subject matter described herein may be implemented and/or utilized in vehicle-to-grid applications (e.g., the DC energy source 118 delivering energy to the AC interface 114 and/or AC energy source 120).

In order to charge the DC energy source 118, the first conversion module 104 converts high-frequency energy at nodes 122, 124 to DC energy that is provided to the DC energy source 118 at the DC interface 102. In this regard, the first conversion module 104 operates as a rectifier when converting high frequency AC energy to DC energy. In the illustrated embodiment, the first conversion module 104 comprises four switching elements (9-12) with each switching element having a diode (29-32) configured antiparallel to the respective switching element to accommodate bidirectional energy delivery. As shown, a capacitor 126 is configured electrically in parallel across the DC interface 102 to reduce voltage ripple at the DC interface 102, as will be appreciated in the art.

In an exemplary embodiment, the switching elements (9-12) are transistors, and may be realized using any suitable semiconductor transistor switch, such as a bipolar junction transistor (e.g., an IGBT), a field-effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 118 for charging the DC energy source 118 when the respective switch is off. As described in greater detail below, in an exemplary embodiment, the control module 116 operates the switches of the first conversion module 104 to provide a path for current from the DC energy source 118 to the isolation module 106 to provide an injection current at nodes 134, 136 of the second conversion module 108.

In the illustrated embodiment, switch 9 is connected between node 128 of the DC interface 102 and node 122 and configured to provide a path for current flow from node 128 to node 122 when switch 9 is closed. Diode 29 is connected between node 122 and node 128 and configured to provide a path for current flow from node 122 to node 128 (e.g., diode 29 is antiparallel to switch 9). Switch 10 is connected between node 130 of the DC interface 102 and node 122 and configured to provide a path for current flow from node 122 to node 130 when switch 10 is closed, while diode 30 is connected between node 122 and node 130 and configured to provide a path for current flow from node 130 to node 122. In a similar manner, switch 11 is connected between node 128 and node 124 and configured to provide a path for current flow from node 128 to node 124 when switch 11 is closed, diode 31 is connected between node 124 and the DC interface 102 and configured to provide a path for current flow from node 124 to node 128, switch 12 is connected between node 130 and node 124 and configured to provide a path for current flow from node 124 to node 130 when switch 12 is closed, and diode 32 is connected between node 124 and the DC interface 102 and configured to provide a path for current flow from the node 130 to node 124.

In an exemplary embodiment, the second conversion module 108 facilitates the flow of current (or energy) from the AC energy source 120 and/or inductive element 110 to the isolation module 106. In the illustrated embodiment, the second conversion module 108 is realized as a front end single-phase matrix converter comprising eight switching elements (1-8) with each switching element having a diode (21-28) configured antiparallel to the respective switching element, in a similar manner as set forth above in regards to the first conversion module 104. For convenience, but without limitation, the second conversion module 108 may alternatively be referred to herein as a matrix conversion module (or matrix converter) or a cycloconverter. As described in greater detail below, the control module 116 modulates (e.g., opens and/or closes) the switches (1-8) of the matrix converter 108 to produce a high-frequency voltage at nodes 122, 124 that achieves a desired power flow to the DC interface 102 and/or DC energy source 118.

In the illustrated embodiment of FIG. 1, a first pair of switches (1, 2) and diodes (21, 22) are coupled between node 132 and node 134, with the first pair of switch and antiparallel diode (e.g., 1 and 21) being configured with opposite polarity as the second pair of switch and antiparallel diode (e.g., 2 and 22). In this manner, switch 1 and diode 22 are configured to provide a path for current flow from node 134 through switch 1 and diode 22 to node 132 when switch 1 is closed, turned on, or otherwise activated and the voltage at node 134 is more positive than the voltage at node 132. Switch 2 and diode 21 are configured to provide a path for current flow from node 132 through switch 2 and diode 21 to node 134 when switch 2 is closed, turned on, or otherwise activated and the voltage at node 132 is more positive than the voltage at node 134. In a similar manner, a second pair of switches (3, 4) and diodes (23, 24) are coupled between node 136 and node 138, a third pair of switches (5, 6) and diodes (25, 26) are coupled between node 132 and node 136, a fourth pair of switches (7, 8) and diodes (27, 28) are coupled between node 134 and node 138.

In the illustrated embodiment, switches 1, 3, 5, and 7 comprise a first set of switches which are capable of commutating the current through the inductive element 110 ($i_L$) (indicated by arrow 190) from node 138 to node 132 when the current through the inductive element 110 is flowing in a negative direction (e.g., $i_L<0$) and switches 2, 4, 6, and 8 comprise a second set of switches that are capable of commutating the current through the inductive element 110 from node 132 to node 138 when the current through the inductive element 110 is flowing in a positive direction (e.g., $i_L>0$), as described in greater detail below. In other words, switches 1, 3, 5, 7 are capable of conducting at least a portion of current flowing in a negative direction through the inductive element 110 (e.g., $i_L<0$) and switches 2, 4, 6, 8 are capable of conducting at least a portion of current flowing in a positive direction through the inductive element 110 (e.g., $i_L>0$). As used herein, commutating should be understood as the process of cycling the current through the inductive element 110 through switches and diodes of the matrix converter 108 such that the flow of current through the inductive element 110 is not interrupted.

In an exemplary embodiment, the isolation module 106 comprises a first set of windings 144 connected between nodes 122, 124 of the first conversion module 104 and a second set of windings 146 connected between nodes 134, 136. For purposes of explanation, the windings 146 may be referred to herein as comprising the primary winding stage (or primary windings) and the sets of windings 144 may be referred to herein as comprising the secondary winding stage (or secondary windings). The windings 144, 146 provide inductive elements that are magnetically coupled in a conventional manner to form a transformer, as will be appreciated in the art. In an exemplary embodiment, the isolation module 106 is realized as a high-frequency transformer. In this regard, the isolation module 106 comprises a transformer designed for a particular power level at a high-frequency, such as the switching frequency of the switches of the conversion modules 104, 108 (e.g., 50 kHz), resulting in the physical size of the transformer being reduced relative to a transformer designed for the same power level at a lower frequency, such as the frequency of the AC energy source 120 (e.g., the mains frequency).

In an exemplary embodiment, the inductive element 110 is realized as an inductor configured electrically in series between node 132 of the matrix converter 108 and a node 140 of the AC interface 114. Accordingly, for convenience, but without limitation, the inductive element 110 is referred to herein as an inductor. The inductor 110 functions as a high-frequency inductive energy storage element during operation of the electrical system 100. The capacitive element 112 is realized as a capacitor coupled between node 140 and node 142 of the AC interface 114, and the capacitor 112 and inductor 110 are cooperatively configured to provide a high frequency filter to minimize voltage ripple at the AC interface 114, as will be appreciated in the art.

The control module 116 generally represents the hardware, firmware and/or software configured to operate and/or modulate the switches of the conversion modules 104, 108 to achieve a desired power flow from the AC energy source 120 to the DC energy source 118. Depending on the embodiment, the control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

During normal operation for grid-to-vehicle applications, the control module 116 determines pulse-width modulated (PWM) command signals that control the timing and duty cycles of the switches (1-8) of the matrix converter 108 to produce a high-frequency AC voltage across the primary windings 146 of the isolation module 106 which induces a voltage across the secondary windings 144 at nodes 122, 124 that results in a desired current ($i_{DC}$) flowing to the DC interface 102 to charge the DC energy source 118. For example, in accordance with one embodiment, the control module 116 generates a sinusoidal PWM variable duty cycle control signal that controls state machine transitions, and thereby, the duty cycle of the switches (1-8) to implement the appropriate switching pattern during a switching interval (e.g., the inverse of the switching frequency). The control module 116 obtains, monitors, or otherwise samples voltage at the DC interface 102 ($V_{DC}$) and compares the obtained DC voltage with a reference voltage (e.g., the desired voltage the DC interface 102) to obtain an error signal that is compared with high frequency carrier signal that corresponds to the switching frequency (e.g., 50 kHz) to obtain the sinusoidal PWM modulated duty cycle. When the error signal is less than the carrier signal, the control module 116 operates the switches 1-8 to effectively short-circuit nodes 132, 138 and cycle energy through the matrix converter 108 to apply a voltage across the inductor 110. When the error signal is greater than the carrier signal, the control module 116 operates the switches (1-8) to release the stored energy and/or voltage of the inductor 110 (alternatively, the fly-back voltage). The sum of the fly-back voltage and the voltage at the AC interface 114 is applied to the primary windings 146 of the isolation module 106, resulting in a power transfer to nodes 122, 124 and/or DC energy source 118. The control module 116 repeats the steps of operating the switches (1-8) to cycle energy through the matrix converter 108 when the error signal becomes less than the carrier signal and releasing the stored energy of the inductor 110 when the error signal is greater than the carrier signal. In this manner, the matrix converter 108 alternates between cycling energy through the inductor 110 and delivering energy to the isolation module 106 and/or DC interface 102 as needed throughout operation of the charging system 100.

As described in greater detail below, in an exemplary embodiment, the control module 116 obtains or otherwise monitors the current ($i_L$) through the inductor 110 (e.g., a measured inductor current via a current sensor), and when the magnitude of the inductor current is greater than a threshold value, determines PWM command signals that control the timing and duty cycles used to operate switches (9-12) of the first conversion module 104 to inject current through the primary windings 146 of the isolation module 106 before transitioning from cycling energy through the inductor 110 to delivering energy to the isolation module 106 and/or DC interface 102. In accordance with one or more embodiments, the control module 116 is coupled to the DC interface 102 and the inductor 110 and determines the timing and duty cycles for the PWM command signals of switches 9-12 based at least in part on the voltage at the DC interface 102 ($V_{DC}$), and the current ($i_L$) through the inductor 110.

It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner. Additionally, although the electrical system 100 is described herein in the context of a matrix converter 108 for a vehicle, the subject matter is not intended to be limited to vehicular and/or automotive applications, and the subject matter described herein may be implemented in any application where an energy conversion module (e.g., buck converters, boost converters, power inverters, current source inverters and/or converters, voltage source inverters and/or converters, and the like) is utilized to transfer energy using switching elements.

Figure 2:
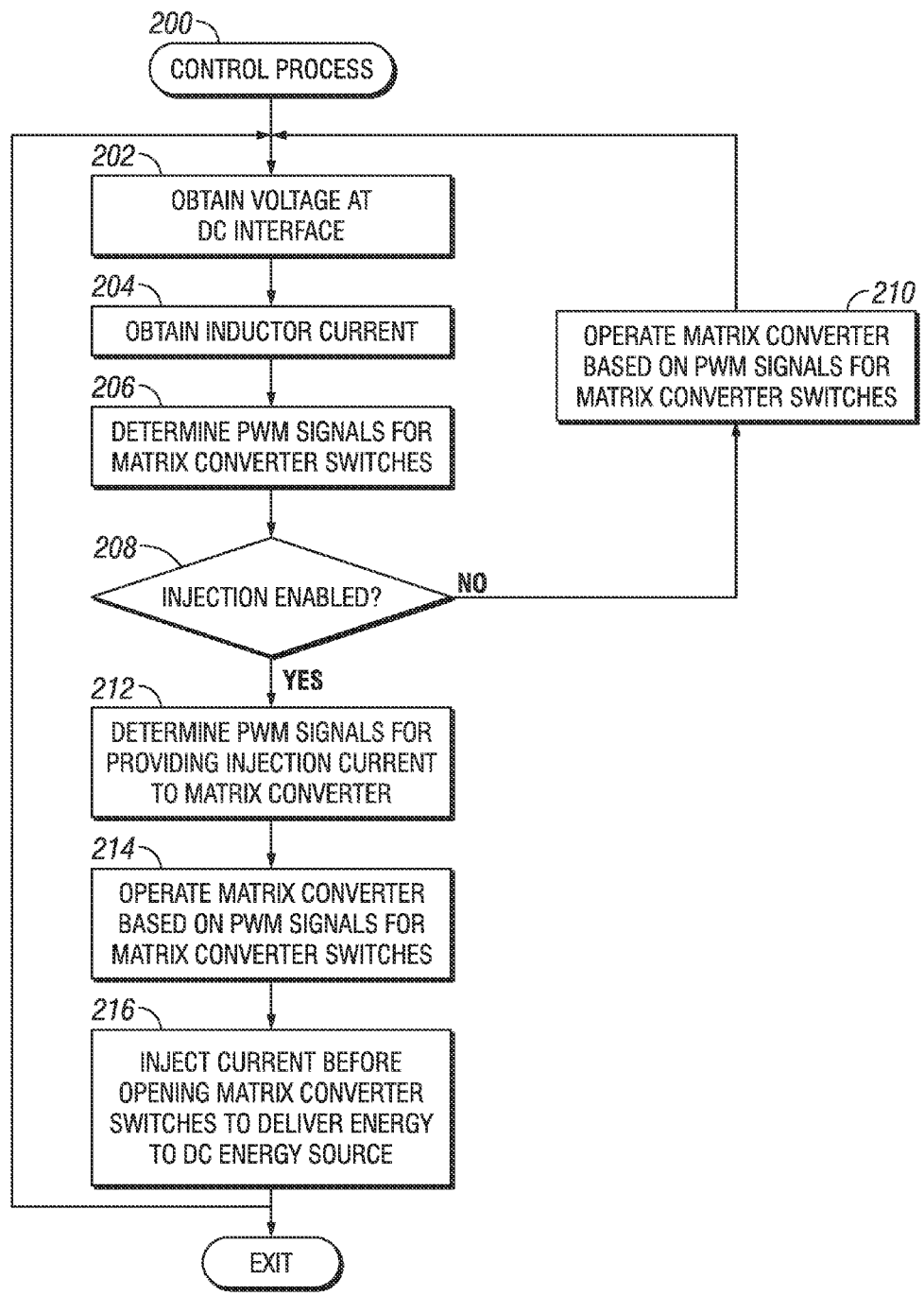
FIG. 2 is a flow diagram of control process suitable for use with the electrical system of FIG. 1 in accordance with one embodiment.

Referring now to FIG. 2, in an exemplary embodiment, an electrical system may be configured to perform a control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the first conversion module 104, the isolation module 106, the matrix converter 108, and/or the control module 116. It should be appreciated that any number of additional or alternative tasks may be included, and may be incorporated into a more comprehensive procedure or process having additional functionality not described in detail herein.

Referring to FIG. 2, and with continued reference to FIG. 1, the control process 200 initializes or begins by obtaining the voltage at the DC interface and obtaining the inductor current (tasks 202, 204). For example, the control module 116 may obtain, sample, or otherwise measure the voltage at the DC interface 102 and the current through the inductor 110 (e.g., via a current sensor configured between the inductor 110 and node 132 or node 140). The control process 200 continues by determining PWM command signals for the switches of the matrix converter (task 206). In this regard, the control module 116 utilizes high-frequency PWM to modulate or otherwise operate the switches (1-8) of the matrix converter 108 to provide a desired voltage (or current) at the output 122, 124 of the secondary windings 144, in a similar manner as described above in the context of FIG. 1. The PWM command signals control the timing of the respective switches (1-8) of the matrix converter 108 over a switching interval (or PWM cycle), that is, when a respective switch is closed, turned on, or otherwise activated.

For example, referring again to FIG. 1, when the inductor current is in a positive direction (e.g., $i_L$>0), the control module 116 concurrently closes (or turns on) switches 2, 4, 6 and 8 to cycle or otherwise circulate the inductor current ($i_L$) through the matrix converter 108 to apply a voltage across the inductor 110. To release the stored energy and/or voltage of the inductor 110 and deliver a positive voltage across (or a positive current through) the secondary windings 144, the control module 116 opens (or turns off) switches 2 and 4 while maintaining switches 6 and 8 in a closed state, such that only switches 6 and 8 are conducting the inductor current ($i_L$) from node 132 to node 138 via the primary windings 146 to apply a positive voltage across the primary windings 146. After a particular amount of time, the control module 116 closes switches 2 and 4 to cycle energy through the matrix converter 108, as set forth above. To deliver a negative voltage across (or a negative current through) the secondary windings 144, the control module 116 opens (or turns off) switches 6 and 8 while maintaining switches 2 and 4 in a closed state, such that only switches 2 and 4 are conducting the inductor current ($i_L$) from node 132 to node 138 via the primary windings 146 to apply a negative voltage across the primary windings 146. The timing of when the switches 2, 4, 6 and 8 are closed as well as the duration for which the switches 2, 4, 6 and 8 are closed (i.e., the duty cycles) are determined by the control module 116 to provide a desired voltage (or current) at the output 122, 124 of the secondary windings 144, as described above.

In a similar manner, when the inductor current is in a negative direction (e.g., $i_L$<0), the control module 116 concurrently closes (or turns on) switches 1, 3, 5 and 7 to cycle or otherwise circulate the inductor current ($i_L$) through the matrix converter 108. To release the stored energy and/or voltage of the inductor 110 and deliver a positive voltage across (or a positive current through) the secondary windings 144, the control module 116 opens (or turns off) switches 5 and 7 while maintaining switches 1 and 3 in a closed state, such that only switches 1 and 3 are conducting the inductor current from node 138 to node 132 via the primary windings 146 to release the stored energy of the inductor 110 and apply a positive voltage across the primary windings 146. After a particular amount of time, the control module 116 closes switches 5 and 7 to cycle energy through the matrix converter 108, as set forth above. To deliver a negative voltage across (or a negative current through) the secondary windings 144, the control module 116 opens (or turns off) switches 1 and 3 while maintaining switches 5 and 7 in a closed state, such that only switches 5 and 7 are conducting the inductor current from node 138 to node 132 via the primary windings 146 to release the stored energy of the inductor 110 and apply a negative voltage across the primary windings 146. The timing of when the switches 1, 3, 5 and 7 are closed as well as the duration for which the switches 1, 3, 5 and 7 are closed (i.e., the duty cycles) are determined by the control module 116 to provide a desired voltage (or current) at the output 122, 124 of the secondary windings 144, as described above.

Referring again to FIG. 2, and with continued reference to FIG. 1, in accordance with one embodiment, the control process 200 determines whether current injection should be enabled (task 208). In this regard, the control module 116 may compare the obtained inductor current ($i_L$) to one or more threshold values to determine whether current injection should be enabled or disabled. For example, in one embodiment, the control module 116 obtains a measured value of the inductor current ($i_L$) (e.g., by sampling and/or reading a value from the current sensor) and determines a moving average ($\bar{i}_L$) for the inductor current based on the most recently obtained value of the inductor current ($i_L$) and previously obtained values for the inductor current. Determining a moving average reduces the effects of noise on the measured values for the inductor current, as will be appreciated in the art. When current injection was not previously enabled for a preceding switching interval, the control module 116 compares the magnitude of the moving average of the inductor current to a first threshold value, and enables current injection when the magnitude of the moving average is greater than the first threshold value. In this regard, the first threshold value is chosen to be a value for a magnitude of current through the inductor 110 that is sufficiently likely to produce transient voltage spikes across switches of the matrix converter 108 that would exceed the breakdown voltages of the switches 1-8. When current injection was enabled for a preceding switching interval, the control module 116 compares the magnitude of the moving average to a second threshold value, and disables current injection when the magnitude of the moving average is less than the second threshold value. In an exemplary embodiment, the first threshold value is greater than the second threshold value to provide hysteresis and prevent the control process 200 from oscillating between enabling and disabling current injection. For example, in accordance with one embodiment, the first threshold value is chosen to be about 4 amperes and the second threshold value is chosen to be about 2 amperes. It should be noted that in some embodiments, current injection may be enabled at all times regardless of the magnitude of the inductor current.

In an exemplary embodiment, in response to determining that current injection should not be enabled (or alternatively, that current injection should be disabled), the control process 200 continues by operating the matrix converter based on the PWM command signals for the switches of the matrix converter (task 210). In this manner, when the current injection is disabled, the control module 116 operates the switches 1-8 of the matrix converter 108 in accordance with the previously determined PWM command signals to alternate between cycling the inductor current through the matrix converter 108 and delivering energy to the DC interface 102 and/or DC energy source 118, as described above. The loop defined by tasks 202, 204, 206, 208 may repeat throughout operation of the electrical system 100 until the inductor current exceeds the first threshold value and the control process 200 determines that current injection should be enabled.

In response to determining that current injection should be enabled, the control process 200 continues by determining PWM command signals for injecting current through the primary windings of the isolation module to the matrix converter (task 212). In an exemplary embodiment, based on the voltage ($V_{DC}$) at the DC interface 102 and the inductor current, the control module 116 determines the timing and duty cycles (or pulse widths) for operating the switches 9-12 of the first conversion module 104 to provide an injection current through the primary windings 146 to reduce the current through one or more of the closed switches of the matrix converter 108 and prevent transient voltage spikes that exceed the breakdown voltages of the switches 1-8 when one or more switches of the matrix converter 108 are subsequently opened. In an exemplary embodiment, the control module 116 implements a two-dimensional lookup table and determines the timing and duty cycles for the switches 9-12 based on the magnitude (or amplitude) of the inductor current ($i_L$) and the voltage ($V_{DC}$) at the DC interface 102. In this regard, the lookup table consists of values for the duty cycles (or pulse widths) for concurrently turning on a respective pair of switches 9-12 and the timing for when the respective switches 9-12 should be turned on/off relative to opening a pair of switches of the matrix converter 108 to deliver energy to the DC interface 102. The control module 116 identifies or otherwise determines the pair of switches 9-12 to be closed concurrently to provide the injection current based on the anticipated direction of the current through the transformer 106. For example, based on the direction of the inductor current ($i_L$) and/or the PWM command signals for the switches 1-8 of the matrix converter 108, the control module 116 identifies switches 9 and 12 as the pair of switches to be closed to provide the injection current through the primary windings 146 from node 134 to node 136 before the matrix converter 108 is operated to apply a negative voltage to the primary windings 146 and identifies switches 10 and 11 as the pair of switches to be closed to provide the injection current through the primary windings 146 from node 136 to node 134 before the matrix converter 108 is operated to apply a positive voltage to the primary windings 146, as described in greater detail below.

After determining PWM command signals for providing an injection current through the primary windings of the isolation module, the control process 200 continues by operating the matrix converter based on the PWM command signals for the switches of the matrix converter and providing the injection current through the primary windings before delivering energy to the DC interface and/or DC energy source (tasks 214, 216). In this manner, the control module 116 operates the switches 1-8 of the matrix converter 108 in accordance with the previously determined PWM command signals to alternate between cycling the inductor current ($i_L$) through the matrix converter 108 and delivering energy to the DC interface 102 and/or DC energy source 118. The control module 116 operates the switches 9-12 of the first conversion module 104 in accordance with the previously determined PWM command signals for injecting current through the primary windings 146 of the isolation module 106 to conduct current through the secondary windings 144 and induce or otherwise provide the injection current through the primary windings 146 before opening one or more switches of the matrix converter 108 to deliver energy to the DC interface 102 and/or DC energy source 118. The loop defined by tasks 202, 204, 206, 208, 210, 212, 214 and 216 may repeat as desired throughout operation of the electrical system 100.

Figure 3:
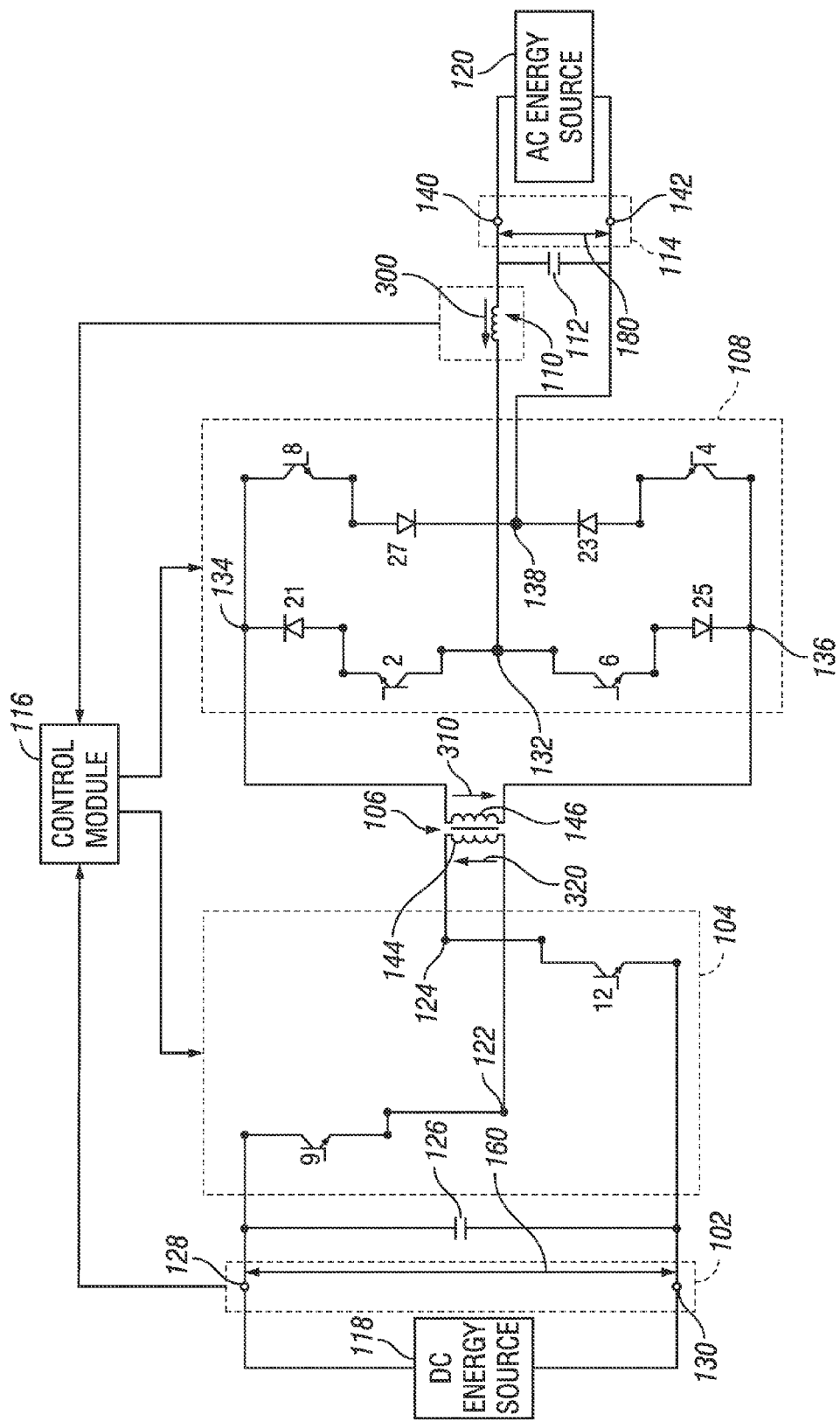
FIGS. 3-6 are schematic views illustrating various states of the switching elements of the electrical system of FIG. 1 suitable for use with the control process of FIG. 2 in exemplary embodiments.

For example, referring now to FIG. 3, and with continued reference to FIGS. 1-2, as described above, when the inductor current ($i_L$) is in a positive direction (indicated by arrow 300) and/or the voltage at the AC interface 140 is positive, the control module 116 closes (or turns on) switches 2, 4, 6 and 8 to cycle or otherwise circulate the inductor current ($i_L$) through the matrix converter 108. In this regard, switches 2 and 6 each conduct at least a portion of the inductor current ($i_L$) at node 132, and switches 8 and 4 each conduct the portion of the inductor current flowing through switches 2 and 6, respectively, to node 138. For clarity and ease of explanation, switches 1, 3, 5, 7 and diodes 22, 24, 26, 28 are not illustrated in the embodiments of FIG. 3 and FIG. 4 because they do not conduct any portion of the inductor current when the inductor current is in the positive direction. The control module 116 determines or otherwise identifies switches 9 and 12 as the pair of switches of the first conversion module 104 to be closed to provide an injection current ($i_{INJ}$) (indicated by arrow 310) through the primary windings 146 before opening switches 6 and 8 to deliver a negative voltage across the secondary windings 144. Similarly, for clarity and ease of explanation, switches 10, 11 and diodes 29-32 are not illustrated in the embodiment of FIG. 3 because they do not conduct any current when switches 9 and 12 are closed and there is no voltage applied across the primary windings 146.

When switches 9 and 12 are closed, the voltage of the DC energy source 118 is applied across the secondary windings 144 resulting in a DC current ($i_{DC}$) (indicated by arrow 320) through the switches 9, 12 and secondary windings 144. The change in current through the secondary windings 144 induces an injection current ($i_{INJ}$) through the primary windings 146 that increases the voltage at node 136 and decreases the voltage at node 134. As the voltage at node 136 increases relative to node 132 and the injection current ($i_{INJ}$) flowing to node 136 increases, the proportion of the inductor current ($i_L$) at node 132 that flows through switch 6 decreases, and similarly, as the voltage at node 134 decreases relative to nodes 132, 138 and the injection current ($i_{INJ}$) flowing from node 134 increases, the proportion of the inductor current ($i_L$) at node 132 flowing through switch 2 increases while the proportion of the current at node 134 that flows through switch 8 decreases. In this manner, the injection current ($i_{INJ}$) reduces the magnitude of the current flowing through switches 6 and 8. In an exemplary embodiment, the control module 116 determines the PWM command signals that control the timing when the switches 9 and 12 are closed relative to the opening of switches 6 and 8 and the duty cycles for closing switches 9 and 12 based on the voltage ($V_{DC}$) at the DC interface 102 and the magnitude of the inductor current ($i_L$) such that the injection current ($i_{INJ}$) is configured to result in the switch currents flowing through switches 6 and 8 being less than a threshold value. The control module 116 subsequently opens (or turns off) switches 6 and 8 when the switch currents through switches 6 and 8 are less than the threshold value while maintaining switches 2 and 4 in a closed state to conduct the inductor current ($i_L$) from node 132 to node 138 through the primary windings 146 and apply a negative voltage across the primary windings 146. In accordance with one embodiment, the threshold value is chosen to be equal to zero amperes and injection current ($i_{INJ}$) is configured to be substantially equal to the inductor current ($i_L$), such that the injection current results in switch currents flowing through switches 6 and 8 being substantially equal to zero when the switches 6 and 8 are opened. In this regard, when the switch currents flowing through switches 6 and 8 are equal to zero, the switch currents flowing through switches 2 and 4 are equal to the inductor current ($i_L$).

Figure 4:
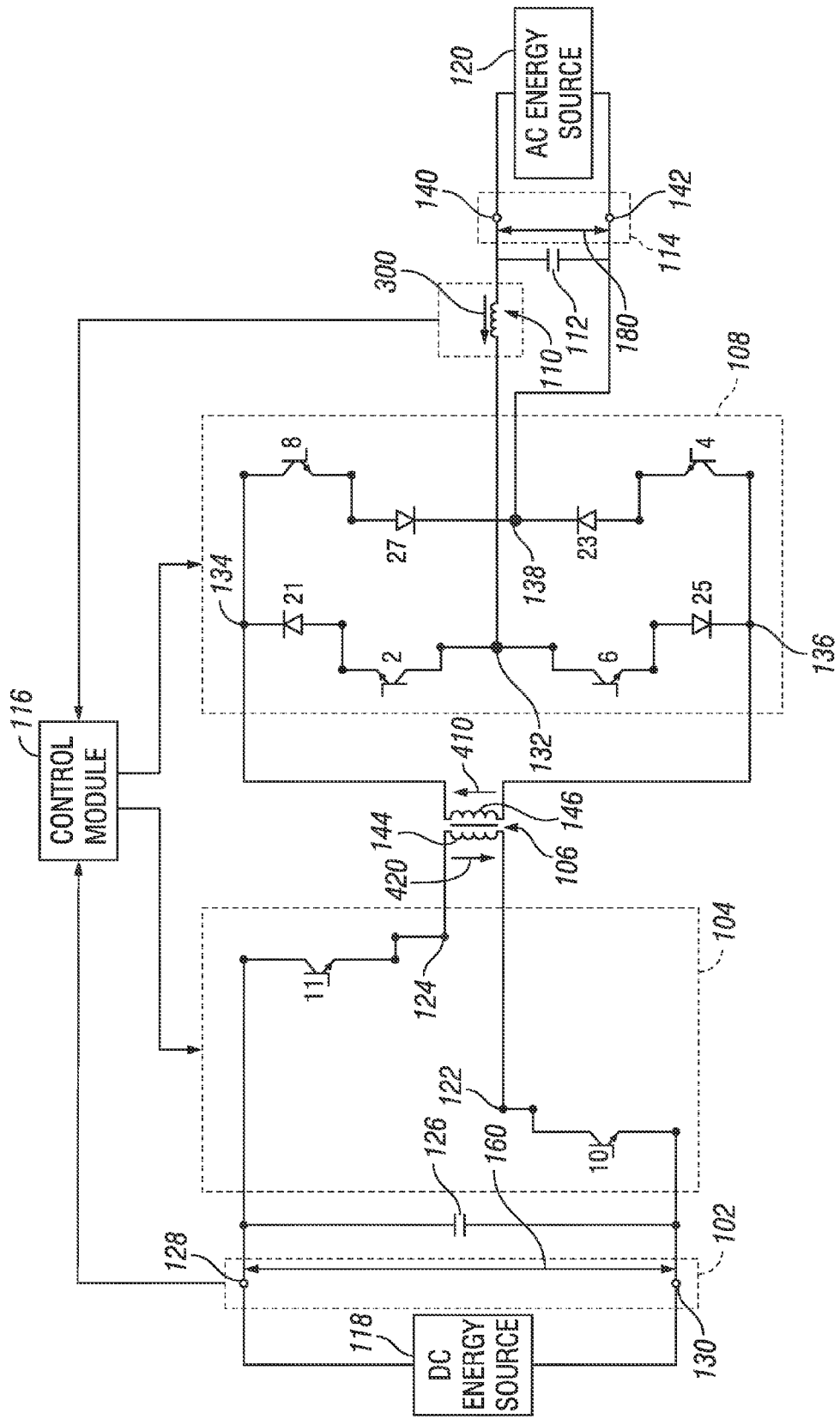

Referring now to FIG. 4, and with continued reference to FIGS. 1-3, when the inductor current ($i_L$) is in a positive direction, before opening switches 2 and 4 to apply a positive voltage across the primary windings 146, the control module 116 closes switches 10 and 11 of the first conversion module 104 to produce an injection current ($i_{INJ}$) (indicated by arrow 410) through the primary windings 146 from node 136 to node 134. When switches 10 and 11 are closed, the voltage of the DC energy source 118 is applied across the secondary windings 144 resulting in a current ($i_{DC}$) (indicated by arrow 420) through the switches 10, 11 and from node 124 to node 122 through the secondary windings 144. The current through the secondary windings 144 induces an injection current ($i_{INJ}$) in the primary windings 146 that increases the voltage at node 134 and decreases the voltage at node 136. As the voltage at node 134 increases relative to node 132 and the injection current ($i_{INJ}$) flowing to node 134 increases, the proportion of the inductor current ($i_L$) at node 132 that flows through switch 2 decreases, and similarly, as the voltage at node 136 decreases relative to nodes 132, 138 and the injection current ($i_{INJ}$) flowing from node 136 increases, the proportion of the inductor current ($i_L$) at node 132 flowing through switch 6 increases while the proportion of the current at node 136 that flows through switch 4 decreases. As described above, the time at which the switches 10 and 11 are closed relative to the opening of switches 2 and 4 and the duration which 10 and 11 are closed are determined based on the magnitude of the voltage ($V_{DC}$) at the DC interface 102 and the magnitude of the inductor current ($i_L$) to produce a current flowing through switches 2 and 4 that is less than a threshold value, and preferably substantially equal to zero, at the time switches 2 and 4 are opened.

Figure 5:
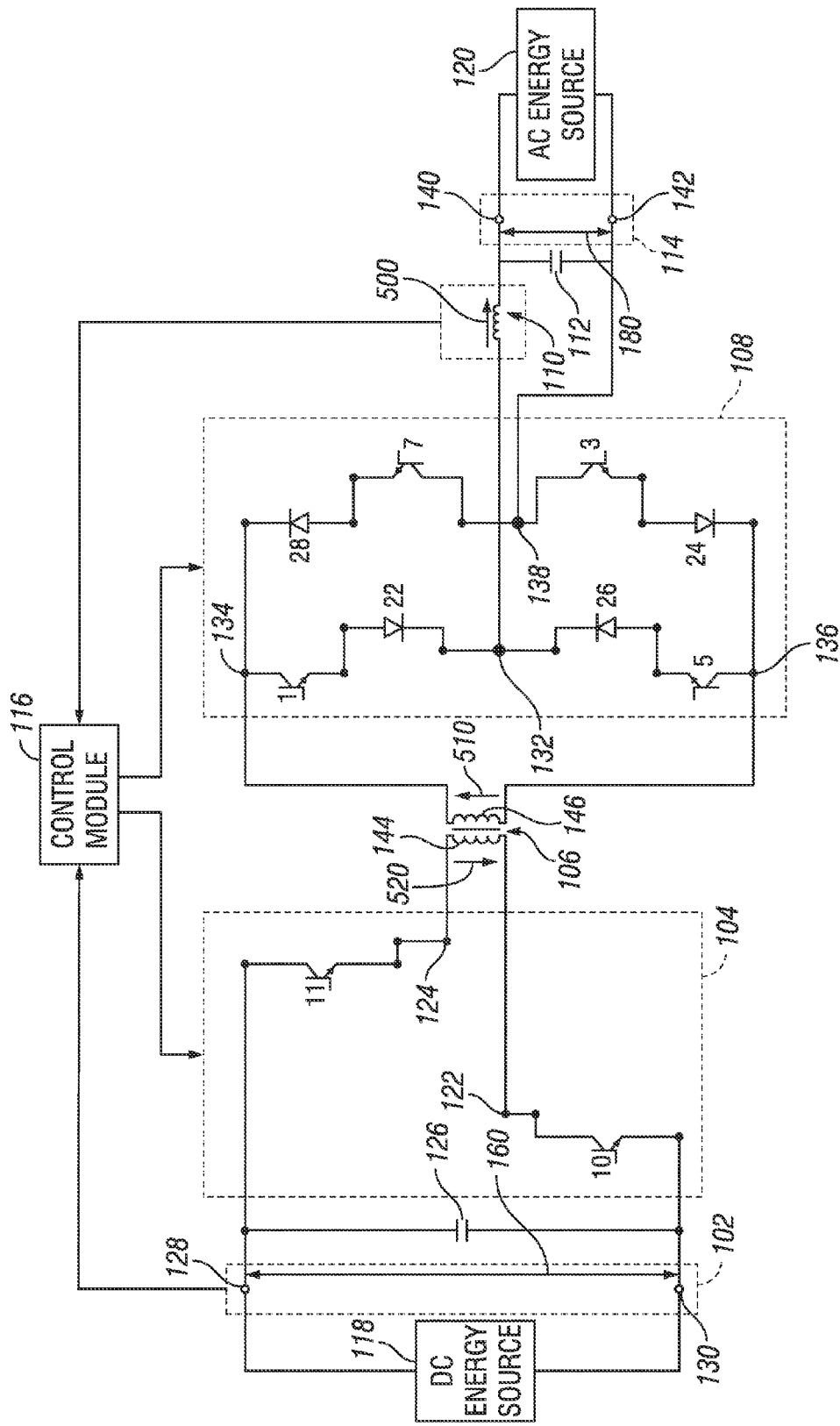

Referring now to FIG. 5, and with continued reference to FIGS. 1-2, when the inductor current ($i_L$) is in a negative direction (indicated by arrow 500) and/or the voltage at the AC interface 140 is negative, the control module 116 closes (or turns on) switches 1, 3, 5 and 7 to cycle or otherwise circulate the inductor current ($i_L$) through the matrix converter 108. In this regard, switches 1 and 5 each conduct at least a portion of the inductor current ($i_L$) at node 132, and switches 7 and 3 conduct the portion of the inductor current flowing through switches 1 and 5, respectively, from node 138. For clarity and ease of explanation, switches 2, 4, 6, 8 and diodes 21, 23, 25, 27 are not illustrated in the embodiments of FIG. 5 and FIG. 6 because they do not conduct any portion of the inductor current when the inductor current is in the negative direction.

In a similar manner as described above, before opening switches 5 and 7 to apply a positive voltage across the primary windings 146, the control module 116 closes switches 10 and 11 of the first conversion module 104 to produce an injection current ($i_{INJ}$) (indicated by arrow 510) through the primary windings 146 in a similar manner as described above. When switches 10 and 11 are closed, the voltage of the DC energy source 118 is applied across the secondary windings 144 resulting in a current ($i_{DC}$) (indicated by arrow 520) that flows through the secondary windings 144 and induces an injection current ($i_{INJ}$) in the primary windings 146 that increases the voltage at node 134 and decreases the voltage at node 136. As the voltage at node 134 increases relative to nodes 132, 138, the proportion of the current at node 138 that flows through switch 7 decreases and the proportion of the inductor current ($i_L$) flowing through switch 1 increases, and similarly, as the voltage at node 136 decreases relative to node 132, the proportion of the inductor current ($i_L$) at node 132 that flows through switch 5 decreases. The control module 116 subsequently opens (or turns off) switches 5 and 7 when the switch currents through switches 5 and 7 are below the desired threshold value while maintaining switches 1 and 3 in a closed state to conduct the inductor current ($i_L$) and apply a positive voltage across the primary windings 146.

Figure 6:
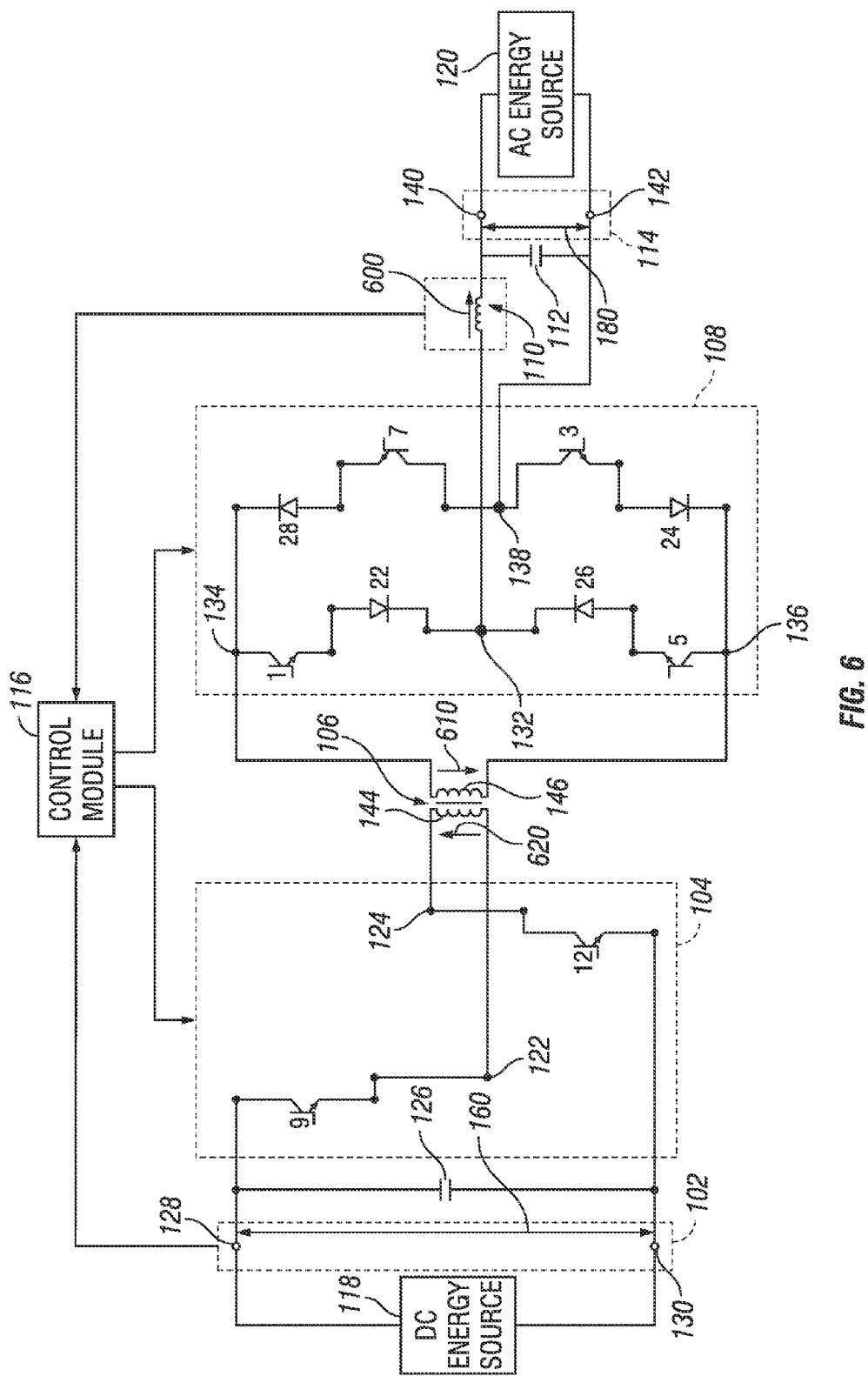

Referring now to FIG. 6, and with continued reference to FIGS. 1-2 and 5, when the inductor current ($i_L$) is in a negative direction, before opening switches 1 and 3 to apply a negative voltage across the primary windings 146, the control module 116 closes switches 9 and 12 of the first conversion module 104 to cause a current (indicated by arrow 620) to flow through the secondary windings 144 and produce an injection current ($i_{INJ}$) (indicated by arrow 610) through the primary windings 146 from node 134 to node 136. As the voltage at node 136 increases relative to nodes 132, 138 and the injection current ($i_{INJ}$) flowing to node 136 increases, the proportion of the inductor current ($i_L$) that flows through switch 5 increases and the proportion of the current at node 138 that flows through switch 3 decreases, and similarly, as the voltage at node 134 decreases relative to nodes 132, 138 and the injection current ($i_{INJ}$) flowing from node 134 increases, the proportion of the inductor current ($i_L$) at node 132 that flows through switch 1 decreases and the proportion of the current at node 138 that flows through switch 7 increases. The control module 116 subsequently opens (or turns off) switches 1 and 3 when the switch currents through switches 1 and 3 are below the desired threshold value while maintaining switches 5 and 7 in a closed state to conduct the inductor current ($i_L$) and apply a negative voltage across the primary windings 146.

To briefly summarize, one advantage of the systems and/or methods described above is that current flowing through one or more switches of the matrix converter is reduced before the respective switch is opened, thereby preventing or otherwise inhibiting voltage spikes when the flow of current to the inductive element(s) of the matrix converter would otherwise be interrupted by turning off or opening the respective switch. This reduces the voltage and/or power handling requirements for components of the matrix converter, which in turn, reduces the size and/or cost for the components of the matrix converter. Additionally, the matrix converter may be implemented using any snubbers or other lossy components that would otherwise contribute additional size, weight, cost, and/or thermal design requirements while decreasing the overall power processing efficiency.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:
1. An electrical system comprising:
a first interface;
a second interface;

an isolation module including a first set of windings magnetically coupled to a second set of windings;
a first conversion module coupled between the first interface and the first set of windings of the isolation module;
a second conversion module coupled between the second interface and the second set of windings of the isolation module, the second conversion module including a first switching element; and
a control module coupled to the first conversion module and the second conversion module, wherein the control module is configured to operate the first conversion module to conduct current through the first set of windings and provide an injection current through the second set of windings to reduce a magnitude of a current through the first switching element before opening the first switching element to deliver energy from the second interface to the first interface.

2. The electrical system of claim 1, wherein:
the first interface comprises a direct current (DC) interface;
the second interface comprises an alternating current (AC) interface; and
the control module is configured to provide the injection current before operating the second conversion module to deliver energy from the AC interface to the DC interface.

3. The electrical system of claim 1, wherein the isolation module comprises:
a first node coupled to the first conversion module;
a second node coupled to the first conversion module, the first set of windings being coupled between the first node and the second node;
a third node coupled to the second conversion module; and
a fourth node coupled to the second conversion module, the second set of windings being coupled between the third node and the fourth node.

4. The electrical system of claim 3, further comprising an inductive element coupled between the second conversion module and the second interface.

5. The electrical system of claim 4, wherein:
the second conversion module includes a set of switching elements configured to allow current through the inductive element in a first direction, the set of switching elements including the first switching element; and
the control module is configured to close each switching element of the set of switching elements to circulate current through the inductive element in the first direction before opening the first switching element.

6. The electrical system of claim 5, wherein the injection current reduces a proportion of the current through the inductive element that flows through the first switching element.

7. The electrical system of claim 4, wherein the control module is configured to operate the first conversion module to provide the injection current in a manner that is influenced by a magnitude of a current through the inductive element.

8. The electrical system of claim 7, wherein the control module is configured to operate the first conversion module to provide the injection current in a manner that is influenced by a magnitude of a voltage at the first interface.

9. The electrical system of claim 3, wherein:
the first conversion module includes a second switching element coupled between the first node and the first interface and a third switching element coupled between the second node and the first interface; and
the control module is configured to close the second switching element and the third switching element to provide the injection current.

10. The electrical system of claim 9, further comprising an inductive element coupled between the second conversion module and the second interface, wherein the control module is configured to determine command signals for closing the second switching element and the third switching element based at least in part on a magnitude of current through the inductive element.

11. The electrical system of claim 9, wherein the control module is configured to determine command signals for closing the second switching element and the third switching element, the command signals being determined such that a magnitude of the injection current results in a current through the first switching element being substantially equal to zero when the first switching element is opened.

12. A method for delivering energy using an energy conversion module including a switching element coupled to an inductive element, the method comprising:
closing the switching element to conduct a switch current through the switching element between a first node to a second node, the switch current including at least some of a current through the inductive element;
providing an injection current at the first node, wherein the injection current decreases a magnitude of the switch current; and
opening the switching element when the magnitude of the switch current is less than a threshold value.

13. The method of claim 12, wherein:
providing the injection current comprises operating a first conversion module coupled between an isolation module and a direct current (DC) interface to provide the injection current to a second conversion module coupled to an alternating current (AC) interface;
the second conversion module includes the switching element; and
the inductive element is coupled between the second conversion module and the AC interface.

14. The method of claim 13, further comprising determining command signals for a plurality of switching elements of the first conversion module based at least in part on the current through the inductive element and a voltage at the DC interface, wherein operating the first conversion module comprises operating the plurality of switching elements in accordance with the command signals.

15. The method of claim 12, wherein providing the injection current comprises inducing the injection current in a set of windings of a transformer coupled to the first node.

16. The method of claim 12, wherein providing the injection current comprises conducting current through a first set of windings magnetically coupled to a second set of windings, the second set of windings being coupled to the first node, the current through the first set of windings inducing the injection current in the second set of windings.

17. The method of claim 12, wherein opening the switching element comprises opening the switching element when a magnitude of the injection current is equal to a magnitude of the current through the inductive element.

18. An electrical system comprising:
a direct current (DC) interface;
an alternating current (AC) interface;
an isolation module including a first set of windings magnetically coupled to a second set of windings;
a first conversion module coupled between the DC interface and the first set of windings;
a second conversion module coupled to the second set of windings;
an inductive element coupled between the second conversion module and the AC interface; and a control module coupled to the first conversion module and the second conversion module, wherein the control module is configured to:
  operate the second conversion module to cycle current through the inductive element; and
  operate the first conversion module to provide an injection current through the second set of windings before operating the second conversion module to deliver energy from the inductive element to the DC interface.

19. The electrical system of claim 18, wherein the control module is configured to:
  determine command signals for operating the first conversion module based on the current through the inductive element and a voltage at the DC interface; and
  operate the first conversion module in accordance with the command signals to provide the injection current through the second set of windings.

20. The electrical system of claim 19, wherein the control module is configured to:
  operate the second conversion module to deliver energy from the inductive element to the DC interface by opening a first switch of the second conversion module; and
  the command signals are configured to produce the injection current having a magnitude substantially equal to the current through the inductive element when the first switch is opened.

\* \* \* \* \*